(12) United States Patent
Baptiste (10) Patent No.: US 10,352,014 B1
(45) Date of Patent: Jul. 16, 2019

(54) GROUND ANCHOR

(71) Applicant: Michael Baptiste, Butler, PA (US)

(72) Inventor: Michael Baptiste, Butler, PA (US)

(*) Notice: Subject to any disclaimer, the term of this patent is extended or adjusted under 35 U.S.C. 154(b) by 0 days.

(21) Appl. No.: 15/594,647

(22) Filed: May 14, 2017

Related U.S. Application Data (60) Provisional application No. 62/336,649, filed on May 14, 2016.

(51) Int. Cl.
*E02D 5/80* (2006.01)
*A01K 1/04* (2006.01)

(52) U.S. Cl.
CPC .............. *E02D 5/801* (2013.01); *A01K 1/04* (2013.01); *E02D 5/80* (2013.01); *E02D 2200/1671* (2013.01)

(58) Field of Classification Search
CPC ... E02D 5/801; E02D 2200/1671; E02D 5/80; E02D 27/42; E02D 27/50; E02D 5/56; E02D 7/22; A01K 1/04; E04H 12/22; E04H 12/2215; E04H 12/1223; E04H 15/62; E04H 12/2223; E04H 17/08; E04H 16/62; A63B 71/023; A63B 2071/024; E01F 9/685; A01G 9/122; A01G 9/128; A45F 3/44; F21V 21/0824; B63B 21/26
USPC ............ 52/155–159, 705; 135/118; 248/156, 248/545, 530; 119/786
See application file for complete search history.

(56) References Cited

U.S. PATENT DOCUMENTS

| | | | | |
|---|---|---|---|---|
| 20,715 A | * | 6/1858 | Hyde | A01K 1/04 119/780 |
| 249,904 A | * | 11/1881 | Covert | A01K 1/04 119/780 |
| 374,646 A | * | 12/1887 | Adams | A01K 1/04 119/780 |
| 501,811 A | * | 7/1893 | Stombaugh | E02D 5/801 174/7 |
| 560,299 A | * | 5/1896 | Mussleman | A01K 1/04 119/790 |
| 571,624 A | * | 11/1896 | Ryan | E02D 5/801 114/295 |
| 730,779 A | * | 6/1903 | Lacy | A01G 9/12 248/156 |
| 740,894 A | * | 10/1903 | Monahan | E02D 5/80 52/156 |
| 786,080 A | * | 3/1905 | Wing | A01K 1/04 24/164 |

(Continued)

*Primary Examiner* — James M Ference
*Assistant Examiner* — Kyle J. Walraed-Sullivan
(74) *Attorney, Agent, or Firm* — Quickpatents, LLC; Kevin Prince (57) ABSTRACT

An anchor for securing an object to a ground surface includes a lower portion having a screw thread extending from a bottom end to a top end thereof. A neck portion extends above the lower portion, is devoid of the screw thread, and terminates at a top end thereof at a first collar. A first loop of a flexible tether is fixed about the neck portion and confined thereto by the first collar and the screw thread. A second opposing loop of the tether is sized to accept the lower portion therethrough, including the thread, but not the first collar. With the tether fixed about the object and the bottom end of the lower portion traversing the second loop as the anchor is screwed into the ground surface, the loops are fixed about the neck portion with the tether secures the object to the ground surface.

13 Claims, 7 Drawing Sheets

(56) References Cited

U.S. PATENT DOCUMENTS

| | | | | |
|---|---|---|---|---|
| 824,182 A * | 6/1906 | Knoff | | A01K 1/04 |
| | | | | 119/786 |
| 829,578 A * | 8/1906 | Enochs | | E02D 5/801 |
| | | | | 24/711.1 |
| 855,675 A * | 6/1907 | Skinner et al. | | A01K 1/04 |
| | | | | 24/168 |
| 861,543 A * | 7/1907 | Shafer | | E02D 5/80 |
| | | | | 256/35 |
| 897,787 A * | 9/1908 | Ryan | | E02D 5/80 |
| | | | | 248/87 |
| 907,799 A * | 12/1908 | Hawley | | E02D 5/80 |
| | | | | 52/157 |
| 925,174 A * | 6/1909 | Haight | | E04H 17/08 |
| | | | | 52/151 |
| 1,037,782 A * | 9/1912 | Luecke | | A01K 1/04 |
| | | | | 54/34 |
| 1,092,036 A * | 3/1914 | Fry | | A01K 1/04 |
| | | | | 119/786 |
| 1,155,421 A * | 10/1915 | Jones | | A01K 1/04 |
| | | | | 119/780 |
| 1,700,224 A | 1/1929 | Hendersen | | |
| 1,791,185 A * | 2/1931 | Birkenmaier | | E02D 5/801 |
| | | | | 403/375 |
| 1,800,504 A * | 4/1931 | Chance | | E02D 5/801 |
| | | | | 52/157 |
| 1,849,268 A * | 3/1932 | Birkenmaier | | E02D 5/801 |
| | | | | 52/157 |
| 2,016,732 A * | 10/1935 | Thompson | | A01G 9/128 |
| | | | | 47/47 |
| 2,139,826 A * | 12/1938 | Huntley | | A01K 97/10 |
| | | | | 248/156 |
| 2,327,567 A * | 8/1943 | Stover | | E02D 5/80 |
| | | | | 24/129 R |
| 2,351,449 A * | 6/1944 | Noble | | E02D 5/80 |
| | | | | 175/419 |
| 2,484,263 A * | 10/1949 | Atkinson | | A01K 1/04 |
| | | | | 119/61.57 |
| 2,502,807 A * | 4/1950 | Temmer | | A01K 1/04 |
| | | | | 119/786 |
| 2,509,166 A * | 5/1950 | Phillips | | A63B 57/10 |
| | | | | 473/392 |
| 2,514,093 A * | 7/1950 | Royston | | A63B 69/0079 |
| | | | | 473/147 |
| 2,525,890 A * | 10/1950 | Gage | | A01K 1/04 |
| | | | | 119/787 |
| 2,569,528 A * | 10/1951 | Kandle | | E02D 5/801 |
| | | | | 403/300 |
| 2,603,319 A * | 7/1952 | Dyche | | E02D 5/801 |
| | | | | 175/394 |
| 2,775,252 A * | 12/1956 | Finch | | E04H 15/62 |
| | | | | 135/118 |
| 2,937,727 A | 5/1960 | Kaczmarek | | |
| 3,076,532 A | 2/1963 | Frye | | |
| 3,100,476 A * | 8/1963 | Peak | | A01K 1/04 |
| | | | | 119/786 |
| 3,295,274 A | 1/1967 | Fulton | | |
| 3,302,328 A * | 2/1967 | King | | A01G 9/128 |
| | | | | 24/457 |
| 3,328,928 A | 7/1967 | Frye | | |
| 3,670,686 A * | 6/1972 | Reynolds | | B63B 21/26 |
| | | | | 114/230.13 |
| 3,743,289 A | 7/1973 | Golomb | | |
| 3,883,102 A * | 5/1975 | Trigg | | G08G 1/02 |
| | | | | 24/115 K |
| 3,883,934 A * | 5/1975 | Rochfort | | F16B 2/248 |
| | | | | 248/302 |
| 3,921,589 A * | 11/1975 | McGahee | | A01K 1/04 |
| | | | | 119/786 |
| 4,038,997 A * | 8/1977 | Smith | | E04H 15/26 |
| | | | | 135/114 |
| 4,093,225 A * | 6/1978 | Oliver | | A63B 69/0079 |
| | | | | 473/575 |
| 4,095,798 A | 6/1978 | Marple | | |
| 4,162,789 A | 7/1979 | Holloway | | |
| 4,334,392 A * | 6/1982 | Dziedzic | | E02D 5/801 |
| | | | | 175/400 |
| 4,387,483 A * | 6/1983 | Larrabee | | E02D 5/801 |
| | | | | 16/422 |
| 4,420,918 A | 12/1983 | Amoux | | |
| 4,656,774 A * | 4/1987 | Terrill | | A01K 97/10 |
| | | | | 248/545 |
| 4,660,835 A * | 4/1987 | Locurto | | A63B 69/0079 |
| | | | | 473/147 |
| 4,702,047 A * | 10/1987 | Stokes | | E02D 5/801 |
| | | | | 114/294 |
| 4,720,095 A | 1/1988 | Sowards | | |
| 4,738,062 A * | 4/1988 | Dickey | | A61C 8/0022 |
| | | | | 433/173 |
| 4,953,576 A * | 9/1990 | Connelly | | E04H 15/322 |
| | | | | 135/118 |
| 4,960,064 A * | 10/1990 | Mestas | | B25D 1/16 |
| | | | | 114/230.26 |
| 4,989,877 A | 2/1991 | Bias | | |
| 5,024,446 A * | 6/1991 | Norman | | A63B 69/0079 |
| | | | | 473/575 |
| 5,031,577 A * | 7/1991 | Flugger | | A01K 1/04 |
| | | | | 119/780 |
| 5,083,796 A | 1/1992 | Norman | | |
| 5,139,235 A * | 8/1992 | Kilmer | | E02D 5/801 |
| | | | | 256/35 |
| 5,161,487 A * | 11/1992 | Miller | | A01K 1/04 |
| | | | | 119/780 |
| 5,199,214 A * | 4/1993 | Caldwell | | A01G 17/04 |
| | | | | 135/118 |
| 5,245,715 A * | 9/1993 | Dinkins | | E04H 15/62 |
| | | | | 135/118 |
| D349,937 S * | 8/1994 | Hill | | D21/791 |
| 5,353,747 A * | 10/1994 | Fain | | A01K 1/04 |
| | | | | 119/780 |
| 5,358,209 A * | 10/1994 | Ward | | E04H 12/2223 |
| | | | | 248/530 |
| 5,364,053 A * | 11/1994 | Rodgers | | E04B 9/18 |
| | | | | 248/302 |
| 5,457,918 A | 10/1995 | Plourde | | |
| 5,501,086 A | 3/1996 | Sherlock | | |
| 5,515,656 A * | 5/1996 | Mihalich | | B64F 1/12 |
| | | | | 248/156 |
| 5,625,983 A * | 5/1997 | Lachance | | E02D 5/74 |
| | | | | 135/118 |
| 5,662,304 A * | 9/1997 | McDaniel | | E04H 12/2223 |
| | | | | 248/499 |
| 5,680,939 A * | 10/1997 | Oliver | | A47B 81/005 |
| | | | | 211/64 |
| 5,699,864 A * | 12/1997 | Dvorak | | E04H 12/2215 |
| | | | | 173/128 |
| 5,749,386 A * | 5/1998 | Samuel, Jr. | | A45B 3/00 |
| | | | | 135/118 |
| 5,785,007 A * | 7/1998 | Sauber | | A01K 1/04 |
| | | | | 119/771 |
| 5,855,129 A | 1/1999 | Warren | | |
| 5,881,978 A | 3/1999 | Rust | | |
| 5,906,077 A | 5/1999 | Andiarena | | |
| D415,955 S * | 11/1999 | Paulson | | D8/388 |
| 6,082,697 A * | 7/2000 | Grunfeld | | A63B 63/004 |
| | | | | 248/156 |
| D447,291 S * | 8/2001 | Willinger | | D30/154 |
| 6,298,611 B1 * | 10/2001 | Oliver | | E02D 5/801 |
| | | | | 248/156 |
| 6,328,665 B1 * | 12/2001 | Gormley | | E04H 12/2246 |
| | | | | 108/161 |
| 6,419,596 B1 | 7/2002 | Dadbeh | | |
| 6,514,161 B1 * | 2/2003 | Minniear | | A63B 69/0002 |
| | | | | 473/423 |
| 6,575,853 B1 * | 6/2003 | O'Neill | | A63B 63/083 |
| | | | | 473/481 |
| D477,118 S * | 7/2003 | Kirch | | 119/787 |
| 6,606,773 B1 * | 8/2003 | Mascolo | | B25B 25/00 |
| | | | | 24/115 G |

(56) References Cited

U.S. PATENT DOCUMENTS

| | | | |
|---|---|---|---|
| 6,629,389 B1 * | 10/2003 | Rust | G09F 7/18 248/551 |
| 6,705,960 B2 * | 3/2004 | Gormley | A63B 43/007 473/417 |
| 6,820,573 B1 * | 11/2004 | McMullin | A01K 1/04 119/786 |
| D505,757 S * | 5/2005 | Wojcik | 119/786 |
| 6,938,384 B1 * | 9/2005 | Hodge | E04H 15/62 135/118 |
| 7,082,954 B1 * | 8/2006 | Flanery | E04H 15/62 135/118 |
| 7,309,198 B1 | 12/2007 | Brown | |
| 7,418,798 B2 * | 9/2008 | Barrett | A01K 97/10 43/21.2 |
| 7,484,477 B2 * | 2/2009 | Wojcik | A01K 1/04 119/51.01 |
| 7,611,129 B1 * | 11/2009 | Stahm | E02D 33/00 254/243 |
| D632,442 S * | 2/2011 | Beck | D30/154 |
| 7,887,263 B2 | 2/2011 | Moffat | |
| D633,379 S | 3/2011 | Chambers | |
| D649,030 S * | 11/2011 | Austin, III | D8/387 |
| 8,066,464 B1 * | 11/2011 | Van Dyke | E04F 15/04 411/458 |
| 8,091,854 B2 * | 1/2012 | Kimbrew | E04H 17/265 248/544 |
| 8,182,371 B2 * | 5/2012 | Norman | A63B 69/0079 473/417 |
| 8,312,832 B1 * | 11/2012 | Camp | B63B 21/26 114/294 |
| 8,561,362 B2 | 10/2013 | Dempsey | |
| 8,562,450 B2 * | 10/2013 | Gormley | A63B 43/007 473/146 |
| 8,800,493 B2 * | 8/2014 | Harding | A01K 5/0142 119/61.57 |
| 9,004,015 B2 * | 4/2015 | Krieger | A01K 29/00 119/786 |
| 9,392,771 B1 * | 7/2016 | Sauer | A01K 27/004 |
| 2002/0066241 A1 * | 6/2002 | Johnson | E04H 12/2223 52/157 |
| 2003/0205647 A1 * | 11/2003 | Boucher | A01G 9/122 248/156 |
| 2004/0103599 A1 * | 6/2004 | Keck | E02D 5/801 52/155 |
| 2004/0163336 A1 * | 8/2004 | Hsu | E04H 12/2223 52/157 |
| 2005/0188627 A1 * | 9/2005 | Alberts | E02D 5/801 52/166 |
| 2005/0274083 A1 | 12/2005 | Shearer | |
| 2006/0051183 A1 * | 3/2006 | Powell | E02D 5/801 411/386 |
| 2006/0113117 A1 * | 6/2006 | Tuller | E21B 10/44 175/394 |
| 2006/0189417 A1 | 8/2006 | Evans | |
| 2007/0144081 A1 | 6/2007 | Caruso | |
| 2007/0145225 A1 | 6/2007 | Bondy | |
| 2007/0240367 A1 * | 10/2007 | Brown | A01K 97/10 52/155 |
| 2007/0283732 A1 * | 12/2007 | Soudan | E04H 12/2223 70/63 |
| 2008/0006756 A1 | 1/2008 | Mitchell | |
| 2008/0008555 A1 * | 1/2008 | Ardern | E04H 12/2223 411/411 |
| 2008/0031695 A1 * | 2/2008 | Nasr | E02D 5/46 405/233 |
| 2008/0072845 A1 * | 3/2008 | Head | A01K 1/04 119/789 |
| 2008/0083172 A1 * | 4/2008 | Tropiano | E04H 12/2223 52/157 |
| 2008/0131200 A1 * | 6/2008 | Winkler | E01F 13/12 404/6 |
| 2008/0302028 A1 * | 12/2008 | Lewenhoff | E02D 5/80 52/157 |
| 2009/0189030 A1 * | 7/2009 | Krasnicki | A45F 3/44 248/156 |
| 2009/0277368 A1 * | 11/2009 | Bulloch | B63B 21/40 114/230.2 |
| 2010/0001242 A1 * | 1/2010 | Moffat | E02D 5/80 254/252 |
| 2010/0196102 A1 * | 8/2010 | Carpenter | E02D 5/80 405/259.1 |
| 2010/0224139 A1 * | 9/2010 | Krieger | A01K 1/04 119/780 |
| 2010/0300017 A1 * | 12/2010 | Bulloch | B63B 21/40 52/157 |
| 2011/0005148 A1 * | 1/2011 | Foster | E02D 5/56 52/157 |
| 2011/0036024 A1 * | 2/2011 | Reinhardt | B63B 21/26 52/157 |
| 2011/0036025 A1 * | 2/2011 | Boulay | E02D 5/801 52/157 |
| 2011/0131895 A1 * | 6/2011 | Dempsey | E02D 5/80 52/157 |
| 2011/0207377 A1 * | 8/2011 | Hawthorne | B63C 9/26 441/84 |
| 2011/0253876 A1 * | 10/2011 | Odell | E04H 12/2215 248/530 |
| 2012/0009022 A1 * | 1/2012 | Meline | E02D 5/808 405/259.1 |
| 2012/0036797 A1 * | 2/2012 | Ardern | E04H 12/2223 52/157 |
| 2012/0125247 A1 * | 5/2012 | Sheridan | B63B 21/22 114/230.13 |
| 2012/0328374 A1 * | 12/2012 | El Naggar | E02D 7/22 405/233 |
| 2013/0092088 A1 * | 4/2013 | Sharp | A01K 1/04 119/61.5 |
| 2013/0145993 A1 * | 6/2013 | Wherley | A01K 1/04 119/787 |
| 2014/0141947 A1 * | 5/2014 | Pickell, III | A63B 21/153 482/125 |
| 2014/0259991 A1 * | 9/2014 | Atchley | E02D 5/805 52/157 |
| 2015/0013620 A1 * | 1/2015 | Royals | A01K 1/04 119/786 |
| 2015/0108295 A1 | 4/2015 | Brooks | |
| 2015/0114053 A1 * | 4/2015 | Staller | E04H 12/2223 70/165 |
| 2015/0225977 A1 * | 8/2015 | Dawson | B66F 19/00 254/199 |
| 2015/0247336 A1 * | 9/2015 | Bergman | E04H 12/2223 52/157 |
| 2016/0023035 A1 * | 1/2016 | Meyer | A63B 1/00 482/38 |
| 2017/0174394 A1 * | 6/2017 | Pence | B65D 25/20 |

* cited by examiner

GROUND ANCHOR

CROSS-REFERENCE TO RELATED APPLICATIONS

This application claims the benefit of U.S. Provisional Patent Application 62/236,649, filed on May 14, 2016, and incorporated herein by reference.

STATEMENT REGARDING FEDERALLY SPONSORED RESEARCH AND DEVELOPMENT

Not Applicable.

FIELD OF THE INVENTION

This invention relates to ground-penetrating stakes, and more particularly to a stake having a novel tether feature.

DISCUSSION OF RELATED ART

In order to prevent sports equipment such as soccer goals from tipping over and endangering players, the goals need to be anchored down to the ground surface. Such anchoring is typically done with a counter balance weight or with earth anchors driven into the ground and attached to the equipment.

Counter ballasts are as effective as they are heavy. The heavier they are the more difficult they are to move. They do not require any tools for installation.

The current earth anchors available have different drawbacks, such as requiring a tool to install or uninstall them. J-hooks are a common anchor used on soccer goals. In order to install them you must hammer them in over part of the equipment. If the equipment needs to be moved then the J hook must be installed in a new location, requiring the use of the hammer again. J-hooks although time consuming to install, often easily pull out of the grounds because the only thing hold them in is friction between the rod and the surrounding dirt.

Rod and split washer anchors have very good retention force. Unfortunately they require a tool to install and are very difficult to install. When equipment is moved such anchors often get left behind which makes the equipment dangerous in its new location with any anchors.

Permanent anchor provided adequate retention force but require the most installation time. They also are not adjustable and may act as a hazard when not in use. Of the four current solutions for anchoring sports equipment, the counter ballast weight is preferred, but such weights are difficult to move and easy to tamper with.

Therefore, there is a need for a device that can be quickly used, either with or without tools, to anchor sports equipment and similar items to a ground surface. Such a needed invention would be easy to use, relatively inexpensive, easy to transport and store, and would provide for means of inhibiting tampering of the device. The present invention accomplishes these objectives.

SUMMARY OF THE INVENTION

The present device is an anchor for securing an object, such as a sports goal, lawn chair, tent, picnic table, or the like to a ground surface. An elongated, rigid lower portion has a ground-penetrating bottom end, a screw thread extending from the bottom end to a top end thereof. A neck portion extends above the top end of the lower portion and is devoid of the screw thread. The neck portion terminates at a top end thereof at a first collar.

A flexible tether has a first end terminating in a first loop, and an opposing second end terminating in a second loop. The first loop is fixed about the neck portion and confined thereto by the first collar and the screw thread. The second loop is sized to accept the lower portion therethrough, including the thread, but not the first collar.

As such, with the flexible tether fixed about the object and with the bottom end of the lower portion traversing the second loop as the anchor is screwed into the ground surface until the lower portion is substantially buried, the first and second loops, are fixed about the neck portion with the tether looped around the object to secure the object to the ground surface in a deployed configuration.

Preferably the first collar includes a tool engagement surface, such as a projecting polygon adapted to receive a rotation driving tool, such as a socket tool. The tool engagement surface may alternately be a screwdriver slot, a recessed polygon adapted to receive a polygonal driving tool, or a handle crank that also serves as the first collar.

In some preferred embodiments, a tool engagement portion extends upwardly from the top end of the neck portion and terminates at a top end thereof at a second collar. The tool engagement portion includes a tool engagement surface, such as an aperture formed therethrough, adapted to receive the rotational driving tool, such as a rigid rod fixed within the aperture.

The present invention is a device that can be quickly used, either with or without tools, to anchor sports equipment and similar items to a ground surface. The present invention is easy to use, relatively inexpensive, easy to transport and store, and provides for means of inhibiting tampering of the device. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
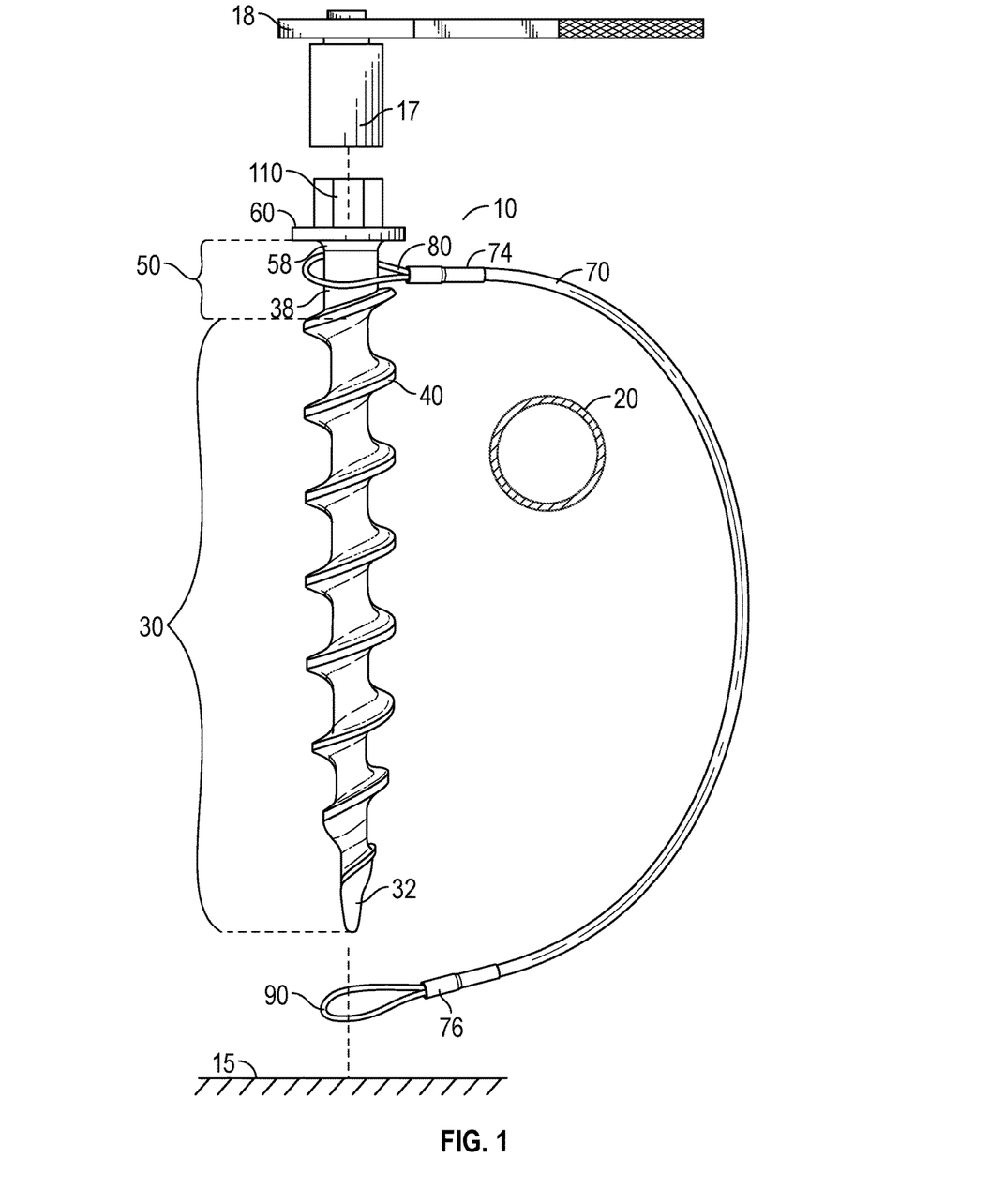
FIG. 1 is an exploded side elevational vie of the invention.
Figure 2:
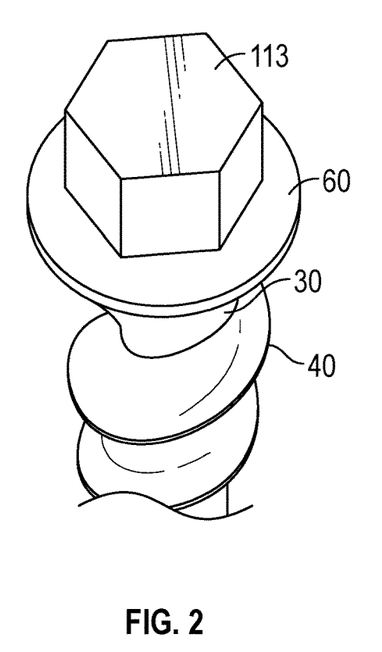
FIG. 2 is a partial top perspective view of the invention, showing one embodiment of a tool engagement surface of the invention with a flexible tether omitted for clarity of illustration.
Figure 8:
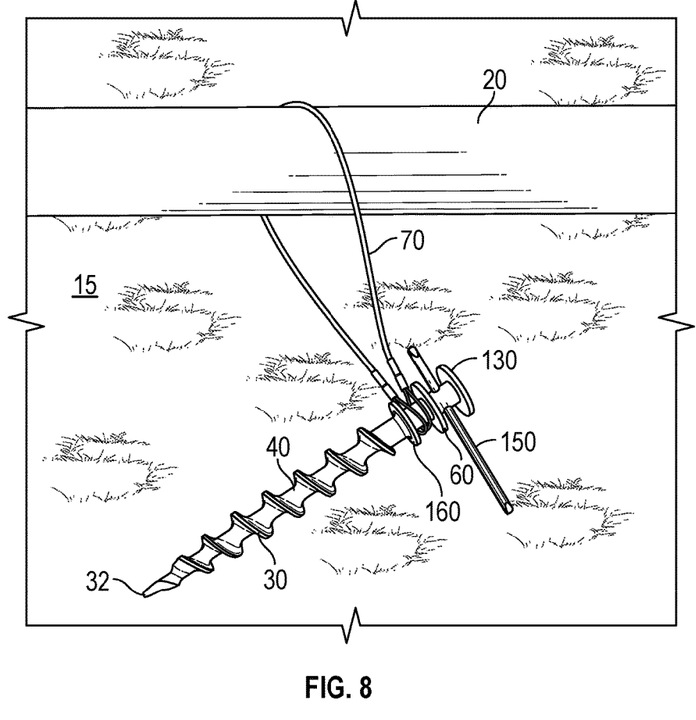
FIG. 8 is a perspective view showing the invention as anchored around an object.
Figure 9:
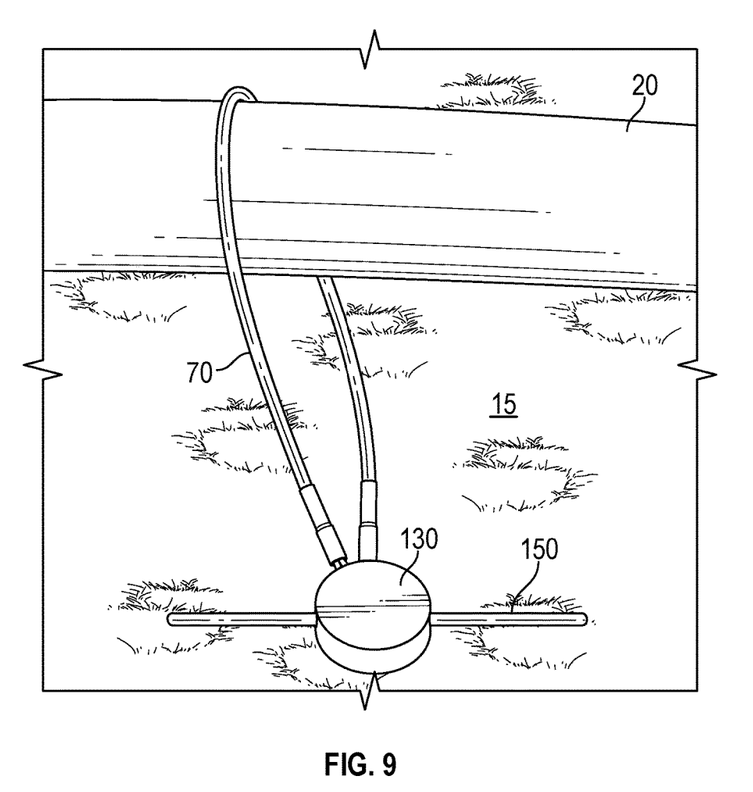
FIG. 9 is a perspective view of the invention as anchored around the object and screwed into a ground surface to secure the object to the ground surface.

FIGS. 1, 8 and 9 illustrate an anchor 10 for securing an object 20, such as a sports goal, lawn chair, tent, picnic table, or the like to a ground surface 15.

An elongated, rigid lower portion 30 has a ground-penetrating bottom end 32, a screw thread 40 extending from the bottom end 32 to a top end 38 thereof. A neck portion 50 extends above the top end 38 of the lower portion 30 and is devoid of the screw thread 40. The neck portion 50 terminates at a top end 58 thereof at a first collar 60. The lower portion 30 and neck portion 50 are preferably integrally formed from a rigid metal material.

A flexible tether 70 has a first end 74 terminating in a first loop 80, and an opposing second end 76 terminating in a second loop 90. The first loop 80 is fixed about the neck portion 50 and confined thereto by the first collar 60 and the screw thread 40. The second loop 90 is sized to accept the lower portion 30 therethrough, including the thread 40, but not the first collar 60. The tether 70 is preferably a steel, stranded cable, or the like.

As such, with the flexible tether 70 fixed about the object 20 and with the bottom end 32 of the lower portion 30 traversing the second loop 90 as the anchor 10 is screwed into the ground surface 15 until the lower portion 30 is substantially buried, the first and second loops 80,90 are fixed about the neck portion 50 with the tether looped around the object 20 to secure the object 20 to the ground surface 15 in a deployed configuration 100.

Figure 3:
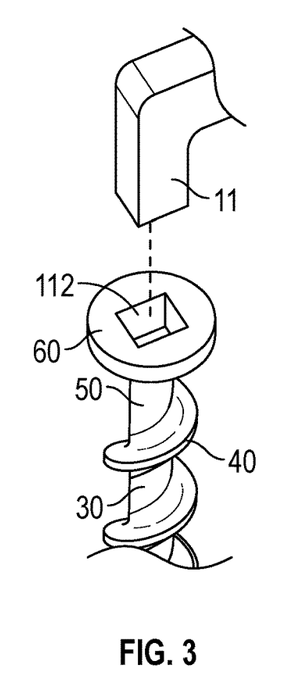
FIG. 3 is a partial top perspective view of the invention, showing an alternate embodiment of a tool engagement surface of the invention, the flexible tether omitted for clarity of illustration.
Figure 4:
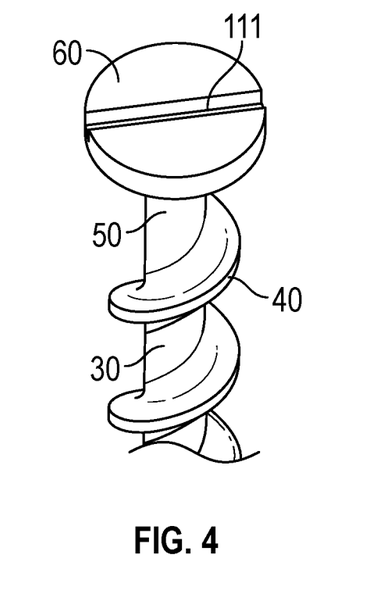
FIG. 4 is a partial top perspective view of the invention, showing another alternate embodiment of a tool engagement surface of the invention, the flexible tether omitted for clarity of illustration.
Figure 5:
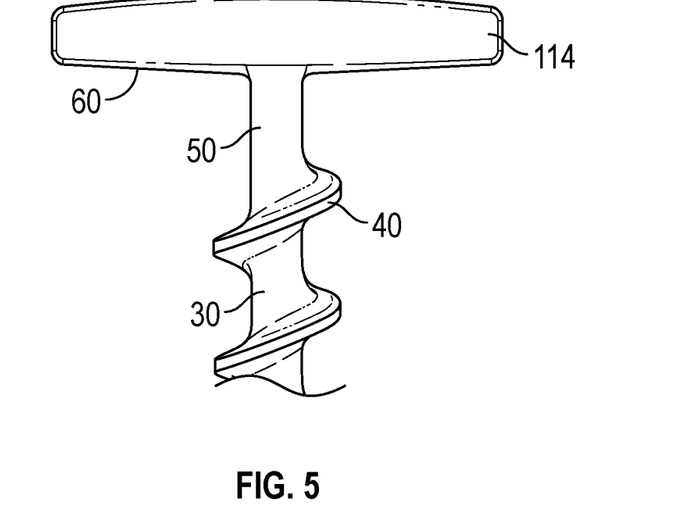
FIG. 5 is a partial top perspective view of the invention, showing yet another alternate embodiment of a tool engagement surface of the invention, the flexible tether omitted for clarity of illustration.

Preferably the first collar 60 includes a tool engagement surface 110, such as a projecting polygon 113 adapted to receive a rotation driving tool 18, such as a socket tool 17 (FIG. 1). The tool engagement surface 110 may alternately be a screwdriver slot 111 (FIG. 4), a recessed polygon 112 adapted to receive a polygonal driving tool 19 (FIG. 3), or a handle crank 114 that also serves as the first collar 60 (FIG. 5).

Figure 6:
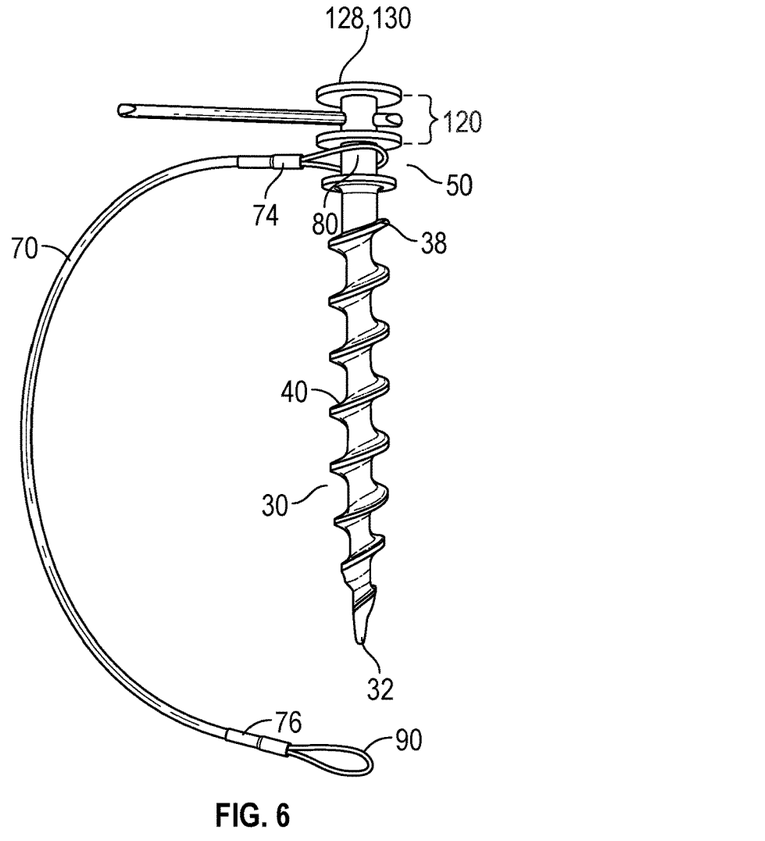
FIG. 6 is a bottom perspective view of the invention, showing yet another alternate embodiment of a tool engagement surface of the invention having a second collar and a slidable rigid rod.
Figure 7:
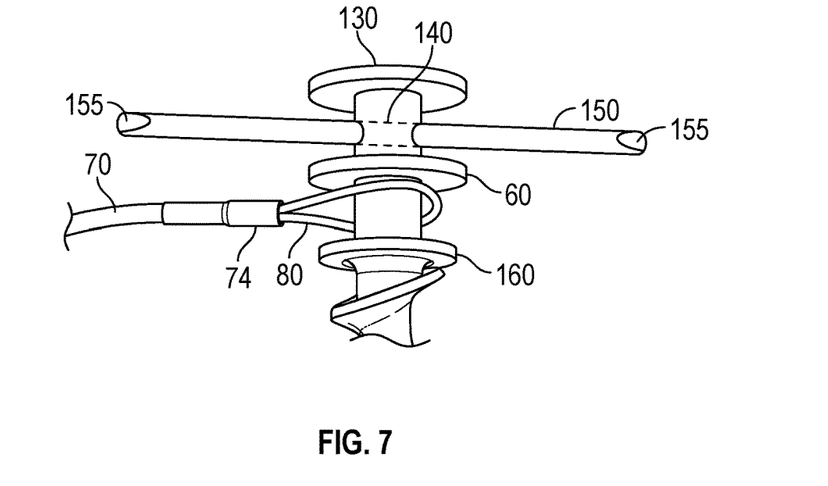
FIG. 7 is an enlarged, partial perspective view of a neck portion and the second collar of FIG. 6.
Figure 12:
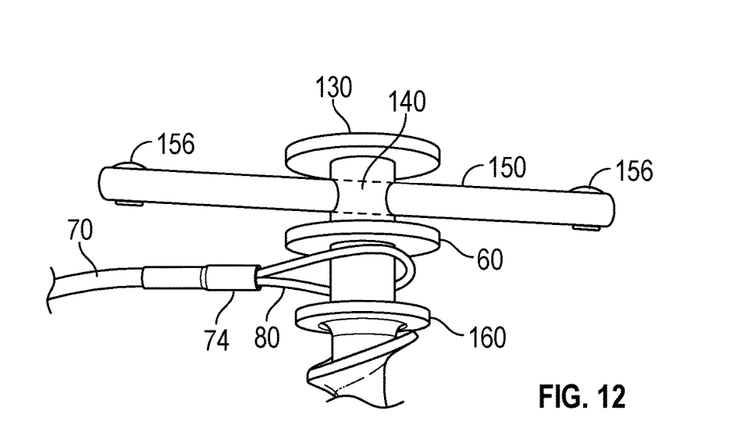
FIG. 12 is an enlarged, partial perspective view of an alternate embodiment of the neck portion and handle.

In some preferred embodiments, a tool engagement portion 120 extends upwardly from the top end 58 of the neck portion 50 and terminates at a top end 128 thereof at a second collar 130. The tool engagement portion 120 includes a tool engagement surface 110, such as an aperture 140 (FIGS. 6, 7 and 12) formed therethrough, adapted to receive the rotational driving tool 18, such as a rigid rod 150 fixed within the aperture 140. In such an embodiment, opposing ends 155 of the rigid rod 150 are deformed to prevent the ends 155 from traversing the aperture 140, or include a rivet 156 or other projecting feature, thereby slidably capturing the rigid rod 150 within the aperture 140. Preferably the tool engagement portion is integrally formed with the lower portion 30 and the neck portion 50.

In some embodiments the top end 38 of the lower portion 30 includes a third collar 160. The first loop 80 of the tether 70 is captured between the first and third collars 60,160 and the second loop 90 is sized to receive therethrough the lower portion 30, screw thread 40 and the third collar 160, but not the first collar 60.

Figure 10:
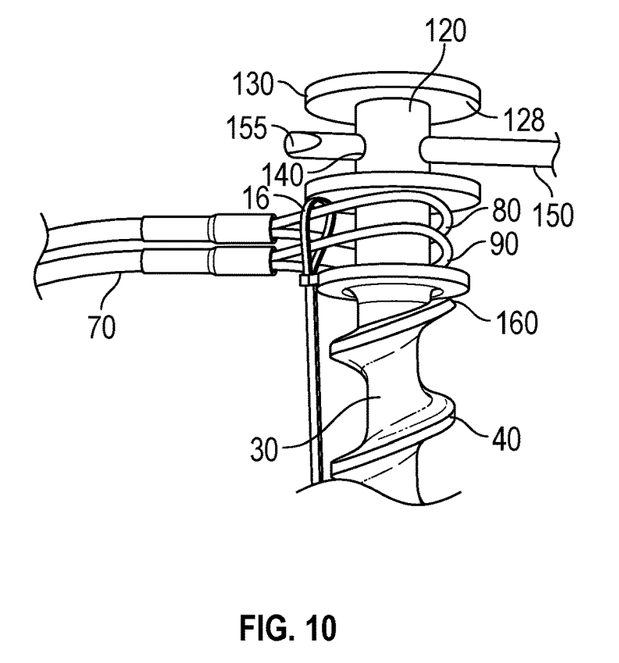
FIG. 10 is a partial perspective view of the invention, illustrated with a plastic cable tie used to lock two loops of the flexible cable tie together.
Figure 11:
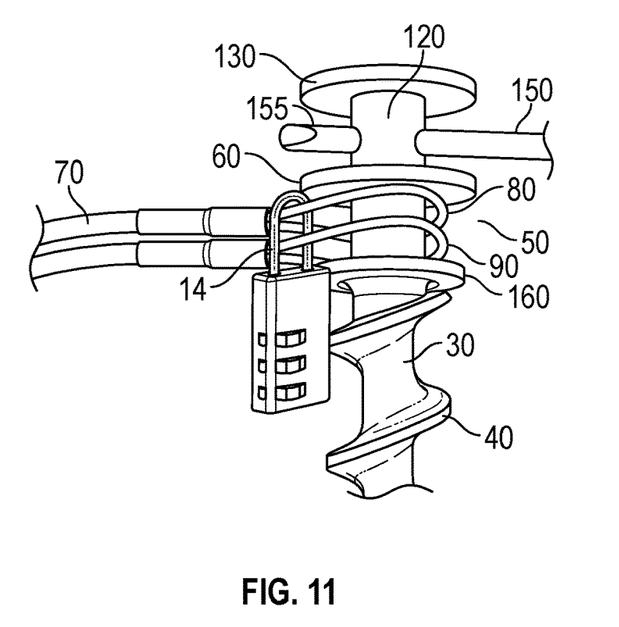
FIG. 11 is a partial perspective view of the invention, illustrated with a padlock used to lock the two loops of the flexible cable tie together.

The first and second loops 80,90 preferably substantially overlap when the anchor is in the deployed configuration 100, whereby a plastic cable tie 16 (FIG. 10), a padlock shackle 14 (FIG. 11), or the like can traverse each loop 80,90 to lock the loops together, inhibiting tampering with the anchor 10.

While a particular form of the invention has been illustrated and described, it will be apparent that various modifications can be made without departing from the spirit and scope of the invention. For example, a few different tool engagement surfaces 110 and tool engagement portions 120 are described herein and illustrated in the drawings. However, other types of tool engagement surfaces 110 and tool engagement portions 120 could be utilized that facilitate the screwing of the anchor 10 into the ground surface 15. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An anchor for securing an object to a ground surface, comprising:
    an elongated lower portion having a ground penetrating bottom end, a screw thread extending from the ground penetrating bottom end to a top end thereof;
    a neck portion extending above the top end of the elongated lower portion and devoid of the screw thread, the neck portion terminating at a top end thereof at a first collar;
    a flexible tether having a first end terminating in a first loop and a second end, of the flexible tether, opposite the first end, terminating in a second loop, the first loop fixed about the neck portion and confined thereto by the first collar and a second collar, the first collar and the second collar sandwiching at least a portion of the neck portion, the second loop sized to accept the elongated lower portion and the second collar therethrough but not the first collar;
    wherein, with the first loop fixed about the neck portion and confined thereto by the first collar and the second collar, the second loop is movable between a first position, without engagement with the elongated lower portion or neck portion, and a second position about the neck portion, adjacent the first loop by moving the second loop along a path from the ground penetrating bottom end and along the screw thread of the elongated lower portion.

2. The anchor of claim 1 wherein the first collar includes a tool engagement surface adapted to receive a rotational driving tool.

3. The anchor of claim 2 wherein the tool engagement surface is a screwdriver slot.

4. The anchor of claim 2 wherein the tool engagement surface is a recessed polygon adapted to receive a polygonal driving tool.

5. The anchor of claim 2 wherein the tool engagement surface is a projecting polygon adapted to receive a rotational socket tool.

6. The anchor of claim 1 further including a tool engagement portion extending upwardly from the neck portion, the tool engagement portion including a tool engagement surface adapted for receiving a rotational driving tool.

7. The anchor of claim 6 wherein the tool engagement surface is an aperture formed through the tool engagement portion and the rotational driving tool is a rigid rod fixed through the aperture, such that the rigid rod may be manually rotated to drive the anchor into the ground surface.

8. The anchor of claim 7 wherein ends of the rigid rod are deformed to prevent the ends from traversing the aperture, thereby slidably capturing the rigid rod within the aperture.

9. The anchor of claim 7 wherein ends of the rigid rod each include a rivet traversing therethrough to prevent the ends from traversing the aperture, thereby slidably capturing the rigid rod within the aperture.

10. The anchor of claim 1 wherein the top end of the elongated lower portion includes a third collar, the first loop of the flexible tether captured between the first and third collars and the second loop sized to receive the elongated lower portion and the third collar but not the first collar.

11. The anchor of claim 1 wherein the first and second loops of the flexible tether are adapted for receiving a plastic cable tie therethrough when the anchor is in a deployed configuration, whereby the anchor becomes tamper resistant.

12. The anchor of claim 1 wherein the first and second loops of the flexible tether are adapted for receiving a padlock shackle therethrough when the anchor is in a deployed configuration, whereby the anchor becomes tamper resistant.

13. The anchor of claim 1, wherein the second collar is defined by at least a top thread portion of the screw thread.

* * * * *

UNITED STATES PATENT AND TRADEMARK OFFICE
CERTIFICATE OF CORRECTION

PATENT NO. : 10,352,014 B1
APPLICATION NO. : 15/594647
DATED : July 16, 2019
INVENTOR(S) : Michael Baptiste Page 1 of 1

It is certified that error appears in the above-identified patent and that said Letters Patent is hereby corrected as shown below:

In the Specification

In Column 2, Line 43, delete "vie" and insert -- view --, therefor.

Signed and Sealed this
Twenty-second Day of August, 2023

Katherine Kelly Vidal
*Director of the United States Patent and Trademark Office*